J. M. WILSON.
PROCESS OF REMOVING PAINT, VARNISH, AND FINISHES.
APPLICATION FILED APR. 4, 1908.
936,842.
Patented Oct. 12, 1909.
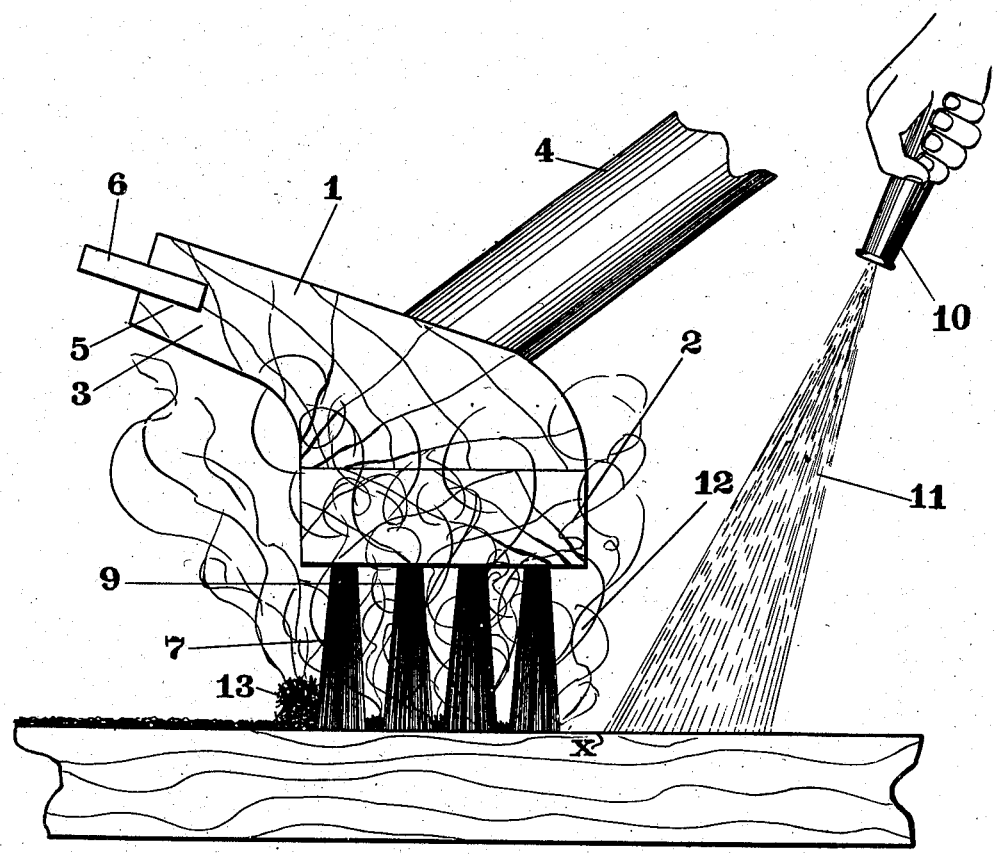

UNITED STATES PATENT OFFICE.

JOHN M. WILSON, OF MONTCLAIR, NEW JERSEY.

PROCESS OF REMOVING PAINT, VARNISH, AND FINISHES.

936,842.   Specification of Letters Patent.   Patented Oct. 12, 1909.

Application filed April 4, 1908. Serial No. 425,267.

*To all whom it may concern:*

Be it known that I, JOHN M. WILSON, a citizen of the United States, and resident of Montclair, in the county of Essex and State of New Jersey, have invented certain new and useful Improvements in Processes of Removing Paint, Varnish, and Finishes, of which the following is a specification.

This invention relates to improvements in processes of removing dried films of paint, varnish and similar finishes that are substantially insoluble in water, by means of so-called volatile paint and varnish removers which are capable of dissolving the oily or waxy ingredients of said films and thereby destroying their affinity for the underlying surfaces. The removal of the slush-like mass so formed, has heretofore been attempted with a cloth, knife, or rubber squeegee, none of which, however, accomplished the complete removal of the same from the irregularities and pores in the surfaces treated to which said film had been applied, without the repeated application of solvent washes, with the result that not only was the grain of the wood noticeably swollen or "raised", but also the removal of the paint and varnish film, or similar finish was rendered extremely expensive, as well as laborious.

My experiments have led to the discovery that the said slush-like masses resulting from the reaction of so-called "neutral" paint and varnish removers on dried films of paint, varnish, or other finishes of a similar nature, can be completely removed without necessitating any "after-wash" prior to the application of a fresh coat of paint, varnish, or other similar finish, to the surface treated, provided means are employed which are capable of automatically conforming to all irregularities in the underlying surface supporting the said film or paint, varnish, or similar finish, and capable of penetrating all pores of sufficient size to occlude particles of wax, and the like, while withal converting said slush-like mass into self-sustaining shreds which are sufficiently porous to permit of the escape of the volatile solvents contained therein, and thereby effect the solidification, to a greater or less degree, as may be required, of the slush-like, or pasty, mass aforesaid. In addition to these features it is essential that a suitable implement be employed which will resist the clogging effect which invariably occurs when the ordinary hog-bristle brushes are applied for this purpose, the same not being sufficiently rigid to penetrate certain mass and to frictionally engage in an efficient manner the underlying surface, as, owing to the absorbent properties of the said bristles, they are rendered so pliant as to be virtually useless in effecting the dislodgment of the viscous paste from the surfaces treated. Moreover, the normal elasticity of said bristles is quite insufficient to overcome the viscosity of the said slush-like, or pasty, mass aforesaid, and thereby clogging of such a brush and the occlusion of the volatile vapors therein becomes inevitable. Similarly the use of a cloth or scraper is objectionable and ineffective, because of the fact that the mass is not sufficiently disintegrated to permit of the free escape of the vapors owing to the non-production of self-sustaining shreds, but also, in lieu of the wax and the like, being completely removed from and lifted out of the interstices, grooves or crevices in the surface treated, it is actually forced and packed thereinto by these means, when they are employed for this purpose. In all these cases not only is it customary to employ a solvent after-wash free from wax-precipitant, in order to dissolve the wax packed in the interstices or crevices aforesaid, but also even the removal in this manner is rendered difficult and is often unsatisfactory, and accordingly the surface is with difficulty rendered into a receptive condition for the application of a new or fresh coat of paint or other finish.

This invention is fully set forth in the following detailed specification and drawings, which form a part thereof, and in which: the figure shown in a longitudinal elevation of a surface coated with a soft mass of paint and varnish, illustrating the application of a combined, non-scratching, wire brush and squeegee for effecting the removal thereof.

Referring to the drawings, the numeral 1 designates a brush-block, to which is secured a brush-back 2. The opposite end of said block comprises an elongated extension 3 having a marginal, longitudinal groove 5, adapted to receive a rubber scraper, or squeegee-member, 6. The said extension 3 projects upwardly at an obtuse angle to a perpendicular, extending through the brush-back, and a handle 4, secured in a socket in the block 1, projects in a direction that is coincident with an extension of the bisector of said obtuse angle, whereby, upon the reversal of the implement, the squeegee member 6 can be employed in identically the same relative position as that illustrated with respect to the brush herein shown, it being understood that the brush-back may be oblong or square in configuration. Annealed steel wire bristle-tufts, 7 and 9, which are normally out of contact with each other, are spaced, in practice, sufficiently far apart to permit of the free escape of vapors, arising from the slush-like or pasty masses resulting from the action of a paint and varnish remover, as indicated by the numeral 11, which may be either manually applied, or pneumatically sprayed upon the surface to be treated, from a nozzle 10, as shown. It is evident that the application of said spray may occur both before and after the application of the wire bristles or filaments, if desired, although in many cases the application subsequent to the removal of the pasty, or slush-like, mass from the surface treated, as indicated in the illustration shown, is entirely unnecessary and superfluous. In fact the use of such spray is indicated, as hereinafter described, as an auxiliary wash in conjunction with the particular type of remover which is free from alcohol, and as specifically stated, it is ordinarily entirely dispensed with.

As illustrated, the application of the annealed steel wire bristles to the amorphous mass resulting from the reaction of the paint and varnish remover upon the film of paint, varnish or other water insoluble finish, disintegrates the same into shreds, and thus permits of the ready escape of the occluded vapors, of alcohol, benzol and the like, from the mass. Also the said bristles, being secured to a common support at one end, and being free and independent at the other end, readily conform to the contour of the surface, such as X, which underlies the said film, the said bristles penetrating all the interstices, grooves or crevices capable of occluding wax and thereby completely dislodging the same therefrom. It is obvious that sufficient pressure is applied through the handle 4, to cause the bristles of the brush, which bristles are, as stated, of annealed steel wire and of a smooth exterior, to penetrate through the amorphous mass aforesaid and into frictional engagement with the underlying surface.

The evaporation of the volatile solvents, as aforesaid, results in the said shreds, which are produced by the action of the wire bristles, being substantially self-sustaining and thereby, in lieu of the bristles in each separate tuft, such as 7 or 9, becoming enveloped in or filled up with a slimy, viscous magma, it is apparent that these shreds will readily separate from the said bristles, owing to their slight viscosity and the relative absence of the solvent therein which would otherwise increase the viscosity. For this reason not only do said shreds tend to advance along the surface in front of the respective bristle-tufts, without completely enveloping the same, but also, owing to the slight viscosity of said shreds, the cohesion of the adjacent bristles of different tufts is unlikely to occur, as not only are the tufts spaced sufficiently far apart, so that the bristles of two adjoining tufts are out of contact with each other when said bristles assume their normal position, the said bristles being in practice spaced longitudinally one-half the transverse spacing, but also, owing to the smoothness of the bristles, there is little or no tendency for the aforesaid shreds to adhere thereto, and in the event of the occlusion of said shreds between the bristles of adjoining tufts, it is merely necessary to give the said brush a slight shake in order to completely dislodge the same therefrom.

In carrying out my invention I preferably use paint and varnish removers containing small amounts of wax, or wax-like compounds, therein, such, for example, as described in the patent of the United States to John M. Wilson, granted November 26th 1907, and numbered 872,314, although it is evident that various other mixtures may be employed. Such a mixture, for example, may comprise a benzol-phenol remover, consisting of one-half pound of paraffin wax dissolved by heating in approximately from three-quarters to one pound of phenol crystals, with the addition of one gallon of benzol (benzene), the mixture being preferably maintained below a temperature of 70° C. during the mixing thereof. When this latter mixture is employed for the treatment of a dried, i. e. weathered, film of paint, varnish, or other water-insoluble finish, which said remover is capable of reacting upon, the amorphous magma produced by the reaction is subjected, in the manner previously described, to the action of the said annealed wire brushes, and subsequent to the removal of the aforesaid amorphous mass or magma by means of said brushes, a precipitating agent, or wash, is applied to the surface so treated, either manually or by means of pneumatic pressure from a nozzle 10 having a suitable needle-valve to eject a spray 11 therefrom. Such a wash preferably consists of one part each of acetone and grain alcohol and two parts carbon tetrachlorid, the same precipitating any wax contained in the solution aforesaid of benzol-phenol remover. It is evident, that in view of the fact said remover is substantially free from a precipitating agent, and therefore comprises a clear solution containing wax, the brushes, while removing substantially all of the wax-containing liquid, will in some instances fail to completely remove the same. In such cases the precipitation of the wax from the resulting solution, not only renders the same easily removable by said brushes, but results in the complete elimination of wax from the said mixture, and thereby avoids the possibility of fresh paint or varnish being applied prior to the complete removal of the wax.

The annealed steel wire bristles are sufficiently elastic to immediately assume their normal position when the pressure is relieved therefrom, irrespective of the viscosity of any amorphous mass or shreds containing paint, varnish and the paint remover utilized, and yet, withal, the said bristles are sufficiently soft to avoid any possibility of the said wires scratching or scoring even the finest of wood upon which the dried film, of paint or varnish treated, exists. Moreover, in spite of these two properties, the said bristles are sufficiently rigid to be capable of overcoming the affinity of the dissolved, viscous, pasty, varnish, paint or the like, for the underlying surface, and are thereby effective for removing every particle of the aforesaid viscous paste therefrom.

Such bristles as above mentioned preferably show the following values when subjected to the usual physical tests: diameter .009″; ultimate strength 12.51 lbs.; ultimate strength per square inch 202,700 lbs.; elastic limit 191,100 lbs. per square inch; modulus of elasticity 29,825,000; hardness (Mohs scale) No. 4.

Subsequent to the removal, by means of the wire bristles, of the paint, varnish or similar finish, the squeegee-member 6 may be employed to dry the surface and render the same in a receptive condition for a new or fresh coat of paint, varnish or other finish. This, however, is not essential in those instances where a brief period or interval in which the evaporation of any remaining liquid may occur, intervenes.

Having thus described my invention, I claim:

1. The herein described process, which consists in subjecting a dried film of paint or varnish to the action of a "paint and varnish remover", capable of reacting thereon and destroying the identity of said film and its affinity for an underlying surface, and then effecting the subdivision of the resulting amorphous mass into fine shreds, while simultaneously separating the same from the said underlying surface, and while permitting of the free escape of the volatile solvents contained in said mass, whereby self-sustaining particles are obtained adapted to be readily dislodged from smooth surfaces which may be brought into contact therewith.

2. The herein described process, which consists in subjecting a dried film of paint or varnish to the action of a "paint and varnish remover", capable of reacting upon said film and destroying the identity of the same and its affinity for an underlying surface, and then effecting the mechanical removal of the resulting mass from the said underlying surface; by causing a plurality of non-absorbent, resilient, metallic bristles, under sufficient pressure to penetrate said mass, to frictionally engage said underlying surface and to displace the said mass from its original position thereon, said bristles being in sufficiently close proximity to each other to effect the removal of said mass completely from the underlying surface within an area defined by the respective outermost bristles which are caused to engage with said surface, said bristles being sufficiently rigid to effect the disintegration of said mass into shreds, thereby permitting of the free escape of the volatile solvents therefrom, and said bristles being capable of penetrating into the interstices, of the surface treated, which are of sufficient size to include appreciable quantities of wax therein and thereby effect the dislodgment of said wax.

3. The herein described process, which consists in subjecting a dried film of paint or varnish to the action of a "paint and varnish remover" containing wax in solution and substantially free from a wax-precipitant, said "paint and varnish remover" being capable of reacting upon said dried film and destroying the identity of said film and its affinity for an underlying surface, and then effecting the mechanical removal of a portion of the resulting mass from the underlying surface, by causing a plurality of non-absorbent, resilient, metallic bristles, under sufficient pressure to penetrate the said mass, to frictionally engage said underlying surface and to displace the said mass from its original position thereon, said bristles being in sufficiently close proximity to each other to effect the removal of said mass from the underlying surface within an area defined by the respective outermost bristles which are caused to engage with said surface, said bristles being sufficiently rigid to effect the disintegration of said mass into shreds, thereby permitting of the free escape of the volatile solvents therefrom, and said bristles being capable of penetrating into the interstices of the surfaces treated, which are of sufficient size to include appreciable quantities of wax therein, and thereby effect the dislodgment of said wax.

4. The herein described process, which consists in subjecting a dried, water-insoluble, film of finish to the action of a "paint and varnish remover" containing wax in solution and substantially free from a wax-precipitant, said "paint and varnish remover" being capable of reacting upon said dried film and destroying the identity of the said film and its affinity for an underlying surface, and then effecting the mechanical removal of a portion of the resulting mass from the underlying surface, by causing a plurality of non-absorbent, resilient, metallic bristles, under sufficient pressure to penetrate the said mass, to frictionally engage said underlying surface and to positively move said mass along said surface, said bristles being in sufficiently close proximity to effect the partial removal of said mass from the underlying surface within an area defined by the respective outermost bristles which are applied to said surface, said bristles being sufficiently rigid to effect the disintegration of said mass into shreds, thereby permitting of the free escape of the volatile solvents therefrom, and said bristles being capable of penetrating into the interstices of the surface treated, which are of sufficient size to include appreciable quantities of the wax therein, and thereby effect the dislodgment of said wax, and then again subjecting the remaining material on said surface to the action of a "paint and varnish remover," containing a wax-precipitant, and then effecting the mechanical removal of the resulting mass from the underlying surface, by causing a plurality of non-absorbent, resilient, metallic bristles, under sufficient pressure to penetrate the said mass, to frictionally engage the said underlying surface and to positively move said mass along the same, said bristles being in sufficiently close proximity to effect the complete removal of said mass from the underlying surface within the area defined by the respective outermost bristles, which are applied to said surface, said bristles being sufficiently rigid to effect the disintegration of said mass into shreds, thereby permitting of the free escape of the volatile solvents therefrom, and said bristles being capable of penetrating into the interstices of the surface treated, which are of sufficient size to include appreciable quantities of wax therein.

5. The herein described process, which consists in subjecting a dried film of paint or varnish to the action of a "paint and varnish remover" containing wax in solution in benzol, and substantially free from a wax precipitant, said paint and varnish remover being capable of reacting upon said dried film and destroying the identity of the same and its affinity for an underlying surface, effecting the partial removal of the resulting mass, and then mixing with the residue of the resulting mass still remaining on said surface a "paint and varnish remover" containing a wax-precipitant, whereby the precipitation of the contained wax is effected and the removal of the resulting mass from the underlying surface is facilitated, and then removing the resulting mass from the underlying surface.

Signed at Newark in the county of Essex and State of New Jersey this 31st day of March A. D. 1908.

JOHN M. WILSON.

Witnesses:
 CLARENCE H. BISSELL,
 C. T. CARLL.